United States Patent
Rioux et al.

(10) Patent No.: US 10,184,354 B2
(45) Date of Patent: Jan. 22, 2019

(54) WINDBACK HEAT SHIELD

(71) Applicant: United Technologies Corporation, Hartford, CT (US)

(72) Inventors: Philip Robert Rioux, North Berwick, ME (US); Nicholas R. Leslie, South Berwick, ME (US); Neil L. Tatman, Brentwood, NH (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 342 days.

(21) Appl. No.: 14/787,320

(22) PCT Filed: May 30, 2014

(86) PCT No.: PCT/US2014/040116
§ 371 (c)(1),
(2) Date: Oct. 27, 2015

(87) PCT Pub. No.: WO2014/204629
PCT Pub. Date: Dec. 24, 2014

(65) Prior Publication Data
US 2016/0069210 A1 Mar. 10, 2016

Related U.S. Application Data

(60) Provisional application No. 61/836,712, filed on Jun. 19, 2013.

(51) Int. Cl.
*F01D 25/14* (2006.01)
*F01D 25/24* (2006.01)
(Continued)

(52) U.S. Cl.
CPC ......... *F01D 25/145* (2013.01); *F01D 17/105* (2013.01); *F01D 25/24* (2013.01);
(Continued)

(58) Field of Classification Search
CPC ...... F01D 25/145; F01D 25/24; F01D 25/243; F01D 25/08; F02C 7/24; F05D 2260/231
See application file for complete search history.

(56) References Cited

U.S. PATENT DOCUMENTS 5,653,581 A * 8/1997 Dixon .................. F01D 25/246
415/134
5,813,836 A 9/1998 Starkweather
(Continued)

FOREIGN PATENT DOCUMENTS

FR 2925108 A1 * 6/2009 .............. F01D 11/18

OTHER PUBLICATIONS

Supplementary European Search Report for European Application No. 14814062.7 dated Nov. 7, 2016.
(Continued)

*Primary Examiner* — Justin Seabe
*Assistant Examiner* — Brian P Wolcott
(74) *Attorney, Agent, or Firm* — Carlson, Gaskey & Olds, P.C.

(57) ABSTRACT

A heat shield includes a first end configured to connect to an inner engine case at an inner connecting point, and a second end configured to connect to an outer engine case at an outer connecting point. The heat shield also includes a bulge extending in an aft direction from a radially upstream portion. A compressor section and a gas turbine engine including the heat shield are also disclosed.

18 Claims, 3 Drawing Sheets

(51) Int. Cl.
  *F01D 17/10* (2006.01)
  *F04D 19/00* (2006.01)
  *F02C 7/24* (2006.01)
  *F02C 6/08* (2006.01)

(52) U.S. Cl.
  CPC .............. *F02C 7/24* (2013.01); *F04D 19/002* (2013.01); *F02C 6/08* (2013.01); *F05D 2220/32* (2013.01); *F05D 2250/36* (2013.01); *F05D 2260/231* (2013.01)

(56) References Cited

U.S. PATENT DOCUMENTS

| | | |
|---|---|---|
| 6,287,075 B1 | 9/2001 | Kercher |
| 6,402,471 B1 | 6/2002 | Demers et al. |
| 7,217,094 B2 | 5/2007 | Cunha et al. |
| 7,220,103 B2 | 5/2007 | Cunha et al. |
| 7,581,927 B2 | 9/2009 | Cunha |
| 8,052,381 B2 * | 11/2011 | Brunet .................... F01D 11/18 415/119 |
| 8,083,485 B2 | 12/2011 | Chon et al. |
| 8,105,030 B2 | 1/2012 | Abdel-Messeh et al. |
| 8,366,393 B2 | 2/2013 | Tibbott |
| 9,835,049 B2 * | 12/2017 | Arnould .................. F01D 9/042 |
| 2003/0005705 A1 * | 1/2003 | Chan ..................... F01D 25/145 60/796 |
| 2006/0005529 A1 * | 1/2006 | Penda ..................... F01D 11/16 60/226.1 |
| 2010/0316484 A1 | 12/2010 | Jasko et al. |
| 2012/0087803 A1 | 4/2012 | Butler et al. |
| 2013/0280091 A1 | 10/2013 | Propheter-Hinckley et al. |
| 2014/0023497 A1 | 1/2014 | Giglio et al. |
| 2016/0123187 A1 | 5/2016 | Leslie et al. |

OTHER PUBLICATIONS

International Preliminary Report on Patentability for International Application No. PCT/US2014/040116 dated Dec. 30, 2015.

* cited by examiner

WINDBACK HEAT SHIELD

CROSS-REFERENCE TO RELATED APPLICATIONS

This application claims priority to U.S. Provisional Application No. 61/836,712, filed Jun. 19, 2013.

BACKGROUND

A gas turbine engine typically includes a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor section.

The engine may include an outer case as well as various inner case structures connected to the outer case. The inner and outer cases may be connected to one another by bolted flanges. These inner and outer cases and flanges may be subject to high thermal gradients, for instance, in areas adjacent to bleed manifolds.

A heat shield may be arranged used to lower the maximum temperature of the inner and outer cases as well as reduce temperature gradients. Some current heat shield designs are installed adjacent to an inner case structure and are connected to the inner case at a radially inward and a radially outward location, providing an air space between the heat shield and the inner case.

SUMMARY

In a featured embodiment, a heat shield for a gas turbine engine has a first end configured to connect to an inner engine case at an inner connecting point, a second end configured to connect to an outer engine case at an outer connecting point, and a bulge extending in an aft direction from a radially inner upstream portion.

In another embodiment according to the previous embodiment, the outer connecting point is aft of the inner connecting point.

In another embodiment according to any of the previous embodiments, the upstream portion is perpendicular to a central engine axis.

In another embodiment according to any of the previous embodiments, the first end of the heat shield curves in the aft direction.

In another embodiment according to any of the previous embodiments, the second end of the heat shield curves in an upstream direction.

In another embodiment according to any of the previous embodiments, the second end of the heat shield includes a foot configured to be received at the outer connecting point.

In another featured embodiment, a compressor section for a gas turbine engine has an inner case arranged around a compressor, the inner case including an inner case flange, an outer case arranged around the inner case, the outer case including an outer case flange connected to the inner case flange, and a heat shield arranged aft of the inner case flange. The heat shield has a first end connected to the inner case at an inner connecting point and a second end connected to the outer case at an outer connecting point, the outer connecting point arranged aft of the outer case flange, and a bulge extending in an aft direction from a radially inner upstream portion.

In another embodiment according to any of the previous embodiments, the compressor includes a port configured to bleed an air stream.

In another embodiment according to any of the previous embodiments, the bleed air stream impinges on the outer case aft of the outer connecting point.

In another embodiment according to any of the previous embodiments, the outer case includes a landing at the outer connecting point configured to receive the heat shield.

In another embodiment according to any of the previous embodiments, the heat shield includes a foot at the second end, and the foot is configured to be received by the landing.

In another embodiment according to any of the previous embodiments, the heat shield defines an air space aft of the inner case.

In another embodiment according to any of the previous embodiments, at least a portion of the air space is radially between the inner case and the outer case.

In another embodiment according to any of the previous embodiments, at least a portion of the air space is axially between the heat shield and the inner case.

In another embodiment according to any of the previous embodiments, the heat shield is connected to the inner case at the inner connecting point by a bolt.

In another featured embodiment, a gas turbine engine has an inner case including an inner case flange, an outer case including an outer case flange connected to the inner case flange, and a heat shield arranged aft of the inner case flange. The heat shield has a first end connected to the inner case at an inner connecting point and a second end connected to the outer case at an outer connecting point, the outer connecting point arranged aft of the outer case flange, and a bulge extending in an aft direction from a radially inner upstream portion.

In another embodiment according to any of the previous embodiments, the inner and outer cases are inner and outer cases of a compressor section, respectively.

In another embodiment according to any of the previous embodiments, the first end curves in an aft direction at the inner connecting point and the second end curves in an upstream direction at the outer connecting point.

In another embodiment according to any of the previous embodiments, the upstream portion is perpendicular to a central axis of the gas turbine engine.

In another embodiment according to any of the previous embodiments, the heat shield defines an air space aft of the inner case and wherein at least a portion of the air space is radially between the inner case and the outer case.

BRIEF DESCRIPTION OF THE DRAWINGS

The disclosure can be further understood by reference to the following detailed description when considered in connection with the accompanying drawings wherein.

DETAILED DESCRIPTION

Figure 1:
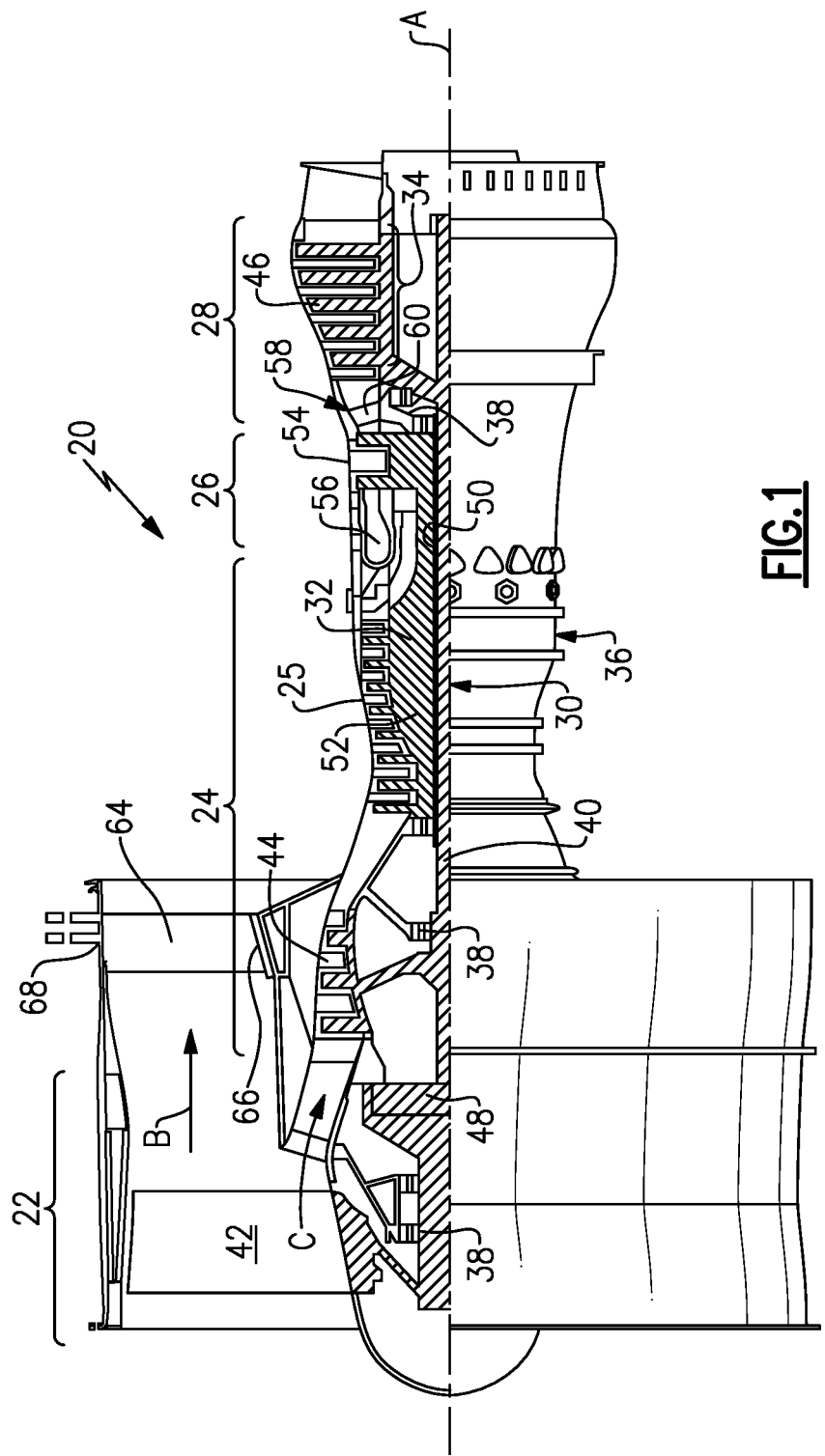
FIG. 1 schematically illustrates a gas turbine engine.

FIG. 1 schematically illustrates an example gas turbine engine 20 that includes a fan section 22, a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24. The compressor section 24 may be surrounded by an outer case 25.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high-speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis A.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 58 of the engine static structure 36 is arranged generally between the high pressure turbine 54 and the low pressure turbine 46. The mid-turbine frame 58 further supports bearing systems 38 in the turbine section 28 as well as setting airflow entering the low pressure turbine 46.

Airflow through the core airflow path C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 58 includes vanes 60, which are in the core airflow path and function as an inlet guide vane for the low pressure turbine 46. Utilizing the vane 60 of the mid-turbine frame 58 as the inlet guide vane for low pressure turbine 46 decreases the length of the low pressure turbine 46 without increasing the axial length of the mid-turbine frame 58. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(Tram\ °R)/(518.7°\ R)]^{\wedge}0.5$. The "Low corrected fan tip speed", as disclosed herein according to one non-limiting embodiment, is less than about 1150 ft/second.

The example gas turbine engine includes the fan 42 that comprises in one non-limiting embodiment less than about twenty-six (26) fan blades. In another non-limiting embodiment, the fan section 22 includes less than about twenty (20) fan blades. Moreover, in one disclosed embodiment the low pressure turbine 46 includes no more than about six (6) turbine rotors schematically indicated at 34. In another non-limiting example embodiment the low pressure turbine 46 includes about three (3) turbine rotors. A ratio between the number of fan blades 42 and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades 42 in the fan section 22 disclose an example gas turbine engine 20 with increased power transfer efficiency.

Figure 2:
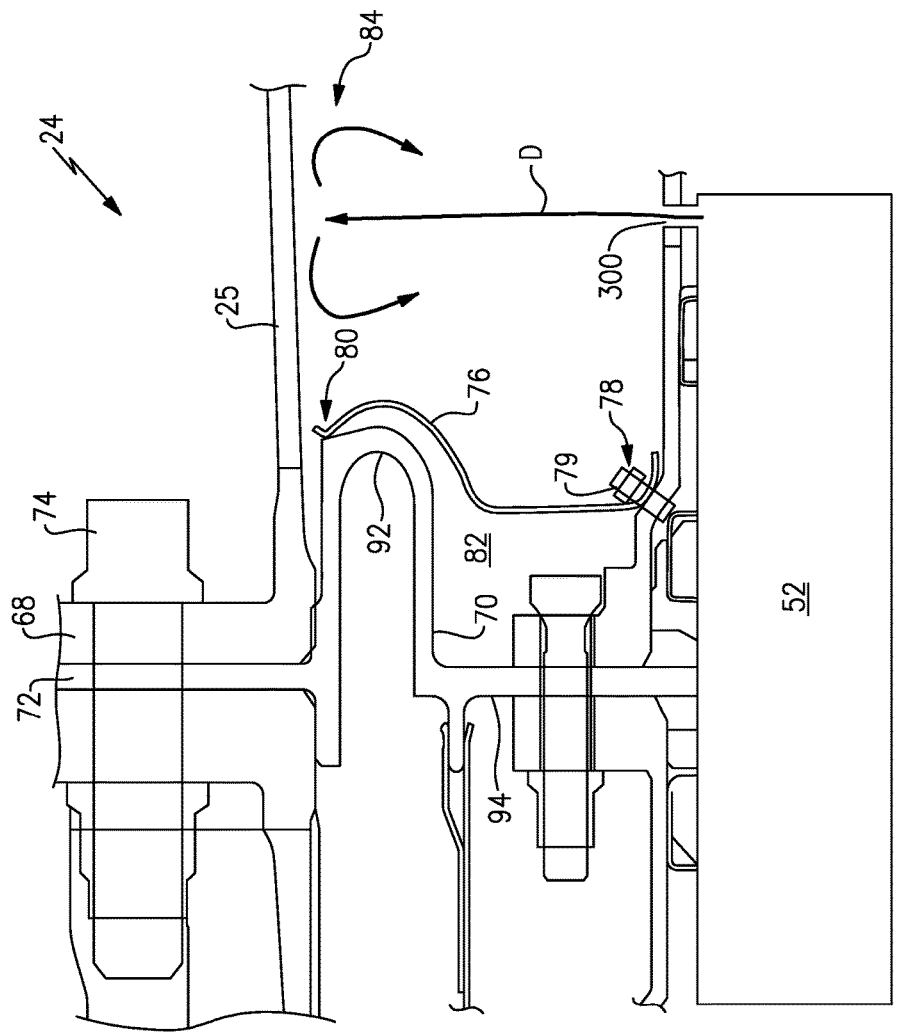
FIG. 2 shows a close-up view of a prior art heat shield for a gas turbine engine compressor section.

Referring to FIG. 2, a close-up view of a prior art compressor section 24 and a high pressure compressor 52 is shown schematically. The outer case 25 surrounds the compressor section 24. The outer case 25 includes a flange 68.

An inner case 70 is positioned radially inward from the outer case 25. The inner case includes a flange 72. The inner and outer case flanges 68, 72 may be held together by a fastener 74.

A heat shield 76 is positioned aft of an inner case 70. The heat shield 76 is connected to the inner case 70 at an inner connecting point 78 and at an outer connecting point 80. The heat shield 76 may be fastened to the inner case 70 at the inner and outer connecting points 78, 80. For example, the heat shield 76 may be bolted to the inner case 70 by a bolt 79. Alternatively, the heat shield 76 may be connected to the inner case 70 in another manner, for example, by snapping the heat shield 76 into the inner case 70, by installing the heat shield 76 into a cavity in the inner case 70 in a press fit relationship, etc. An air cavity 82 is present between the inner case 70 and the heat shield 76. The air cavity 82 provides thermal protection for the inner case 70 by reducing conduction of heat from the compressor section 24 to the inner case 70.

In one example, an area radially inward from the outer case 25 and aft from the heat shield 76 can act as a bleed manifold chamber 84. The bleed manifold 84 may receive a bleed air stream D from the high pressure compressor 52 via a port 300. The bleed air stream D can then be piped from the manifold 84 to other parts of the engine 20, such as the turbine section 28, for cooling. When the bleed air stream D enters the manifold 84, it may impinge on the outer case 25 adjacent to the outer and inner case flanges 68, 72. The bleed air stream D may carry heat from the high pressure compressor 52 and transfer this heat to the outer case 25. The heat may then transfer through the outer case 25 to the outer case flange 68 and increase the temperature in the outer case flange 68. Furthermore, this heat transfer may create temperature gradients in the outer case 25 and outer case flange 68.

Figure 3:
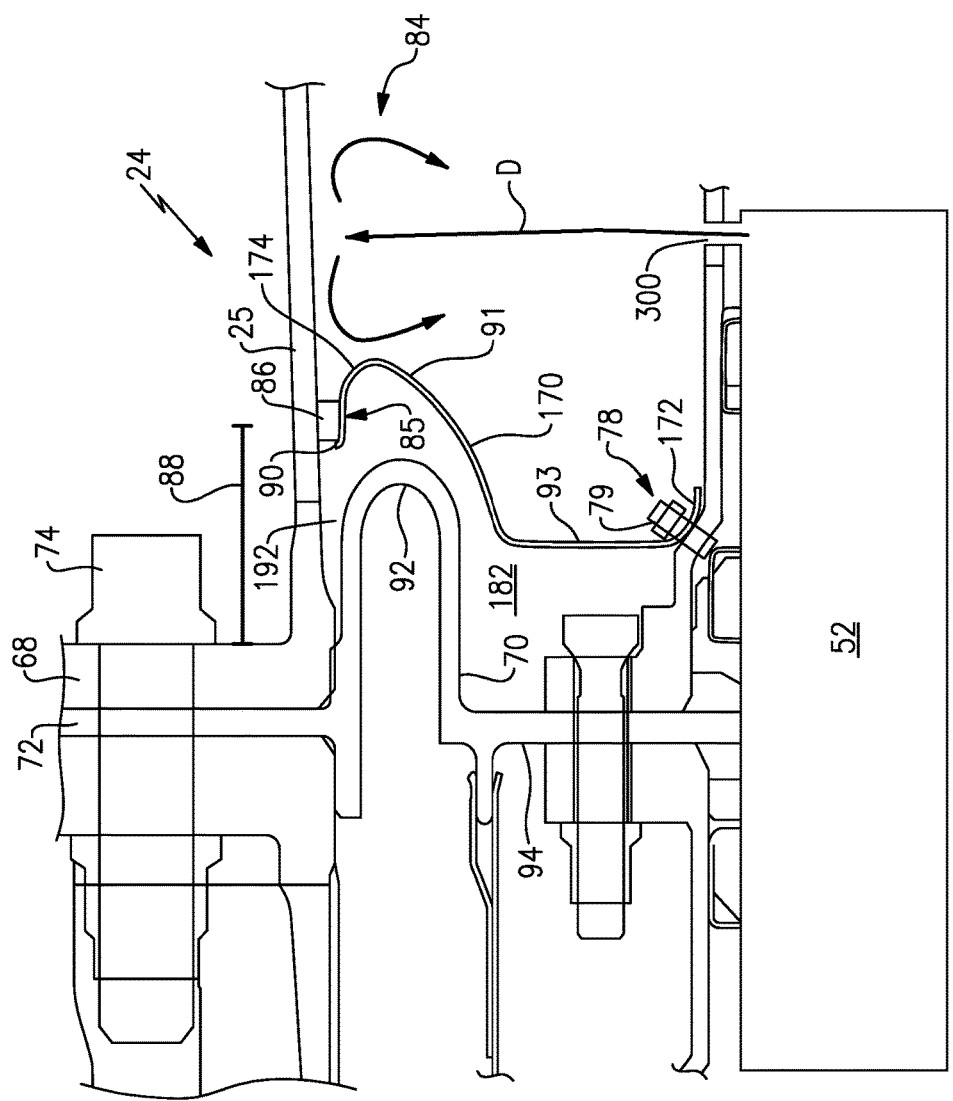
FIG. 3 shows a close-up view of a heat shield for a gas turbine engine compressor section.

FIG. 3 shows a heat shield 170. A first end 172 of the heat shield 170 is connected to the inner case 70 at the inner connecting point 78, for example, by a bolt 79. The first end 172 of the heat shield 170 curves in the aft direction at the inner connecting point 78. A second end 174 of the heat shield 170 is supported by the outer case 25 at an outer connecting point 85. The second end 174 curves in an upstream direction at the outer connecting point 85.

In one example, the outer case 25 has a landing 86 at the outer connecting point 85. The landing 86 may be positioned aft of the inner connecting point 78. The landing 86 is positioned a distance 88 aft of the outer case flange 68. The landing 86 may be a ring attached to the interior of the outer case 25. The landing 86 provides additional mass to the outer case 25, which slows the thermal response of the outer case 25 to temperature changes within the compressor section 24, for example, due to the impinging bleed air stream D. In one example, the bleed air stream D may be a bleed air stream from a stage of the high pressure compressor 52.

The heat shield 170 includes a foot 90 which allows the outer case 25 to snap into the heat shield 170. In one example, the outer case 25 is installed over the heat shield 170 once the heat shield 170 has been attached to the inner case 70 at the inner connecting point 78.

The heat shield 170 has a windback shape which trails along the shape of the inner case 70. The heat shield 170 includes a bulge 91 which extends in the aft direction from an upstream portion 93 that is radially inward from the bulge 91. Similarly, the inner case 70 includes a bulge 92 which extends in the aft direction from an upstream portion 94. The upstream portions 93, 94 may be perpendicular to the outer case 25 and/or the central engine axis A. The windback shape allows for axial and radial motion between the outer and inner cases 25, 70, for example, in the case of thermal expansion during engine 20 operation. The movement tolerance provided by the windback shape of the heat shield 170 may allow the outer and inner cases 25, 70 to respond to thermal changes within the compressor section 24 at different rates. For example, the outer case 25 may deform or grow due to thermal changes while the inner case 70 is not affected, and the movement tolerance provided by the heat shield 170 would allow the outer case 25 to move freely to prevent a force from being exerted on the inner case 70 due to the deformation or growth.

The heat shield 170 provides a larger air space 182 between the heat shield 170 and the inner case 70 as compared to the prior art heat shield 76 of FIG. 2. The landing 86 allows the heat shield 170 to be supported by the outer case 25 but remain spaced apart from the outer case 25, to increase the size of the air space 182. The larger air space 182 improves the thermal protection provided to the inner case 70. The heat shield 170 also provides an additional air space 192 between the inner case 70 and the outer case 25. The additional air space 192 provides thermal protection for the outer case 25 and the outer case flange 68 from high temperatures in the compressor section 24.

In the example shown in FIG. 3, the heat shield 170 is positioned adjacent to the high pressure compressor 52. However, it should be understood that in another example, the heat shield 170 may be positioned in another part of the engine 20, such as adjacent to the low pressure compressor 44 or in the turbine section 28.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A heat shield for a gas turbine engine, comprising:
   a first end configured to connect to an inner engine case at an inner connecting point;
   a second end configured to connect to an outer engine case at an outer connecting point, wherein the second end of the heat shield curves in an upstream direction; and
   a bulge extending in an aft direction from a radially inner upstream portion, wherein the first end of the heat shield curves in the aft direction.

2. The heat shield of claim 1, wherein the outer connecting point is aft of the inner connecting point.

3. The heat shield of claim 1, wherein the upstream portion is perpendicular to a central engine axis.

4. The heat shield of claim 1, wherein the second end of the heat shield includes a foot configured to be received at the outer connecting point.

5. A compressor section for a gas turbine engine, comprising:
   an inner case arranged around a compressor, the inner case including an inner case flange;
   an outer case arranged around the inner case, the outer case including an outer case flange connected to the inner case flange; and
   a heat shield arranged aft of the inner case flange, the heat shield having a first end connected to the inner case at an inner connecting point and a second end connected to the outer case at an outer connecting point, the outer connecting point arranged aft of the outer case flange, and a bulge extending in an aft direction from a radially inner upstream portion, wherein the second end of the heat shield curves in an upstream direction.

6. The compressor of claim 5, wherein the compressor includes a port configured to bleed an air stream.

7. The compressor of claim 6, wherein the bleed air stream impinges on the outer case aft of the outer connecting point.

8. The compressor of claim 5, wherein the outer case includes a landing at the outer connecting point configured to receive the heat shield.

9. The compressor of claim 8, wherein the heat shield includes a foot at the second end, and the foot is configured to be received by the landing.

10. The compressor of claim 5, wherein the heat shield defines an air space aft of the inner case.

11. The compressor of claim 10, wherein at least a portion of the air space is radially between the inner case and the outer case.

12. The compressor of claim 10, wherein at least a portion of the air space is axially between the heat shield and the inner case.

13. The compressor of claim 5, wherein the heat shield is connected to the inner case at the inner connecting point by a bolt.

14. A gas turbine engine, comprising:
an inner case including an inner case flange;
an outer case including an outer case flange connected to the inner case flange; and
a heat shield arranged aft of the inner case flange, the heat shield having a first end connected to the inner case at an inner connecting point and a second end connected to the outer case at an outer connecting point, the outer connecting point arranged aft of the outer case flange, and a bulge extending in an aft direction from a radially inner upstream portion, wherein the second end of the heat shield curves in an upstream direction.

15. The gas turbine engine of claim 14, wherein the inner and outer cases are inner and outer cases of a compressor section, respectively.

16. The gas turbine engine of claim 14, wherein the first end curves in an aft direction at the inner connecting point.

17. The gas turbine engine of claim 14, wherein the upstream portion is perpendicular to a central axis of the gas turbine engine.

18. The gas turbine engine of claim 14, wherein the heat shield defines an air space aft of the inner case and wherein at least a portion of the air space is radially between the inner case and the outer case.

* * * * *